US012669933B2

(12) United States Patent
Arai et al.

(10) Patent No.: US 12,669,933 B2
(45) Date of Patent: Jun. 30, 2026

(54) STORAGE UPGRADE COMPATIBILITY REPORTING

(71) Applicant: International Business Machines Corporation, Armonk, NY (US)

(72) Inventors: Sohichiroh Arai, Fujisawa (JP);
Tomoaki Kawaoka, Shizuoka (JP);
Kenji Takahashi, Kanagawa (JP);
Kentaro Kajimura, Yokohama (JP);
Hideki Tsuboi, Gifu (JP); **Kenji
Kikuchi, Kawaguchi (JP); Ryoko
Yamashita**, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 18/369,181

(22) Filed: Sep. 17, 2023

(65) Prior Publication Data

US 2025/0094045 A1 Mar. 20, 2025

(51) Int. Cl.
G06F 3/06 (2006.01)

(52) U.S. Cl.
CPC .......... G06F 3/0607 (2013.01); G06F 3/0634 (2013.01); G06F 3/0673 (2013.01)

(58) Field of Classification Search
CPC ... G06F 8/61–71; G06F 11/1433–1464; G06F 3/0605–0607
See application file for complete search history.

(56) References Cited

U.S. PATENT DOCUMENTS

| | | | |
|---|---|---|---|
| 8,479,056 B2 | 7/2013 | Andrews et al. | |
| 9,146,726 B2 | 9/2015 | Jibbe et al. | |
| 9,703,490 B2 | 7/2017 | Xu et al. | |
| 10,263,844 B1* | 4/2019 | Wu | G06F 8/654 |
| 2017/0201415 A1* | 7/2017 | Radhakrishnan ... | H04L 67/1097 |
| 2018/0004504 A1* | 1/2018 | Stenfort | G06F 8/65 |
| 2019/0026141 A1* | 1/2019 | Mahajan | G06F 9/45558 |
| 2021/0349705 A1 | 11/2021 | Sasson et al. | |

OTHER PUBLICATIONS

IBM Redbooks, "IBM Flex System V7000 Storage Node Introduction and Implementation Guide," available at Ibm.com/redbooks, Sep. 2013.
VMWare, "vSphere Storage—Viewing Storage Devices Available to an ESXi Host," available at https://docs.vmware.com/en/VMware-vSphere/8.0/vsphere-esxi-vcenter-801-storage-guide.pdf, Oct. 18, 2022.

* cited by examiner

*Primary Examiner* — Duy Khuong T Nguyen

(74) *Attorney, Agent, or Firm* — Gavin Giraud

(57) ABSTRACT

A method for facilitating storage system upgrades is disclosed. In one embodiment, such a method includes identifying host systems configured to access a storage system. The method identifies a current host code level for each host system. The method determines a latest storage code level for the storage system that is supported by each host system at its current host code level. The method reports the latest storage code level to a user to enable the user to upgrade the storage system to the latest storage code level without upgrading any of the current code levels of the host systems. In certain embodiments, reporting the latest storage code level further includes reporting an overlapping range of storage code levels that are supported by each host system at its current code level. A corresponding system and computer program product are also disclosed.

17 Claims, 8 Drawing Sheets

100

Computer 101

Processor Set 110

| Processing Circuitry 120 | Cache 121 |

Communication Fabric 111

Volatile Memory 112

Persistent Storage 113

| Operating System 122 | Storage Infrastructure Management Module 150 |

Peripheral Device Set 114

| UI Device Set 123 | Storage 124 | IoT Sensor Set 125 |

Network Module 115

WAN 102

End User Device 103

Remote Server 104

Remote Database 130

Private Cloud 106

Gateway 140

Public Cloud 105

| Cloud Orchestration Module 141 | Host Physical Machine Set 142 |
| Virtual Machine Set 143 | Container Set 144 |

Fig. 1

STORAGE UPGRADE COMPATIBILITY REPORTING

BACKGROUND

Field of the Invention

This invention relates to data storage and more specifically to systems and methods for facilitating storage system upgrades.

Background of the Invention

The code level (e.g., firmware) of enterprise storage systems such as the IBM DS8000 may be periodically updated to fix bugs, provide performance enhancements, implement security improvements, and the like. Staying up to date with the latest code level may be important to ensure the stability and security of the storage system. However, updating the code level is a critical operation that requires careful consideration due to potential concerns and risks.

For example, compatibility is a significant concern. An enterprise storage system such as the DS8000 is typically an integral part of a larger IT infrastructure, including host servers and storage management software. Upgrading the code level of the enterprise storage system without ensuring compatibility with these other components can lead to unforeseen issues, including data access problems, performance degradation, or even system outages. Any update to an enterprise storage system's firmware can introduce changes to the way the storage system operates, potentially affecting the stability of data stored within it. Data loss or corruption, even on a small scale, can have severe consequences for organizations. Thus, its important to thoroughly assess compatibility in order to mitigate risks when performing a code level update.

SUMMARY

The invention has been developed in response to the present state of the art and, in particular, in response to the problems and needs in the art that have not yet been fully solved by currently available systems and methods. Accordingly, systems and methods have been developed for facilitating storage system upgrades. The features and advantages of the invention will become more fully apparent from the following description and appended claims, or may be learned by practice of the invention as set forth hereinafter.

Consistent with the foregoing, a method for facilitating storage system upgrades is disclosed. In one embodiment, such a method includes identifying host systems configured to access a storage system. The method identifies a current host code level for each host system. The method determines a latest storage code level for the storage system that is supported by each host system at its current host code level. The method reports the latest storage code level to a user to enable the user to upgrade the storage system to the latest storage code level without upgrading any of the current code levels of the host systems. In certain embodiments, reporting the latest storage code level further includes reporting an overlapping range of storage code levels that are supported by each host system at its current code level. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which:

FIG. 1 is a high-level block diagram showing one example of a computing system for use in implementing embodiments of the invention;

DETAILED DESCRIPTION

Figure 2:
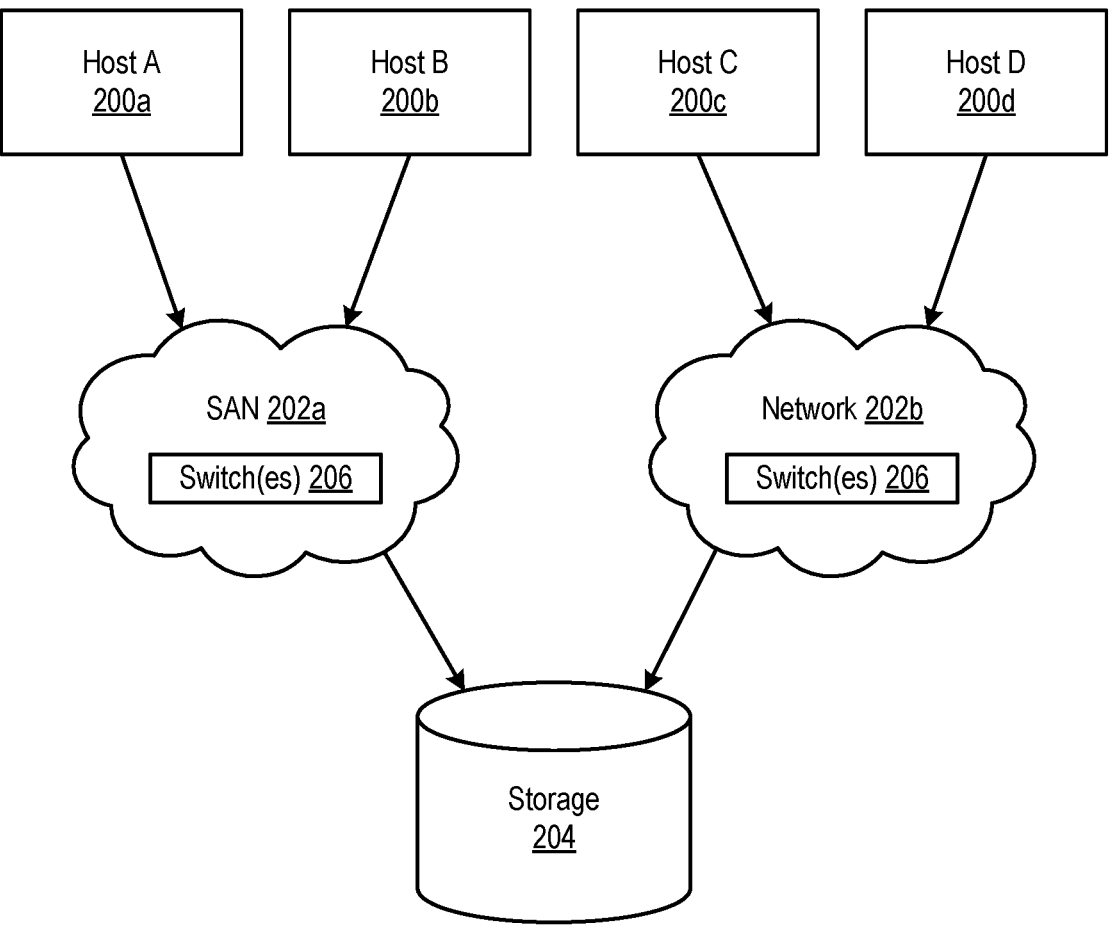
FIG. 2 is a high-level block diagram showing various host systems and switches connected to a storage system, such as an enterprise storage system.

Several examples will now be provided to further clarify various potential embodiments of the invention:

Example 1: A method for facilitating storage system upgrades includes identifying host systems configured to access a storage system. The method identifies a current host code level for each host system. The method determines a latest storage code level for the storage system that is supported by each host system at its current host code level. The method reports the latest storage code level to a user to enable the user to upgrade the storage system to the latest storage code level without upgrading any of the current code levels of the host systems. These features have the technical effect and/or advantage of facilitating code level upgrades to storage systems to fix bugs, provide performance enhancements, and implement security improvements in the storage systems without causing unforeseen issues.

Example 2: The limitations of Example 1, where the host systems include one or more of operating systems, host bus adapters, network interface cards, hypervisors, and switches. This feature has the technical advantage of further defining the host systems and associated code levels that are used to determine to which storage code levels a storage system can be upgraded.

Example 3: The limitations of any of Examples 1-2, where reporting the latest storage code level further includes reporting an overlapping range of storage code levels that are supported by each host system at its current host code level. This feature has the technical effect and/or advantage of not only reporting the latest storage code level, but also a range of storage code levels that are supported by each host system at its current host code level, thereby providing a range of storage code level upgrades to fix bugs, provide performance enhancements, and implement security improvements in storage systems without causing unforeseen issues.

Example 4: The limitations of any of Examples 1-3, further including determining a potential storage code level for the storage system that is supported by each host system in the event the host code level of at least one host system is upgraded. This has the technical effect and/or advantage of facilitating a storage code level upgrade beyond what is supported by current code levels of host systems.

Example 5: The limitations of any of Examples 1-4, further comprising reporting the potential storage code level to the user to enable the user to upgrade the storage system with the potential storage code level in the event the host code level of at least one host system is upgraded. This has the technical effect and/or advantage of facilitating a storage code level upgrade beyond what is supported by current code levels of host systems.

Example 6: The limitations of any of Examples 1-5, where identifying a current host code level for each host system comprises checking a compatibility table to identify the current host code level for each host system. This feature has the technical effect and/or advantage of leveraging a compatibility table to determine what storage code levels the host systems and their current code levels will support.

Example 7: The limitations of any of Examples 1-6, where the storage system is an enterprise storage system. This feature has the technical effect and/or advantage of further defining the type of storage that may benefit from a storage code level upgrade.

Example 8: A system including one or more processor and one or more computer-readable storage media collectively storing program instructions which, when executed by the processor, are configured to cause the processor to perform a method according to any of Examples 1-7. This feature has the technical effect and/or advantage of improving and/or specially programming a computing system to perform the method steps described above.

Example 9: A computer program product including one or more computer readable storage media, and program instructions collectively stored on the one or more computer readable storage media, the program instructions comprising instructions configured to cause one or more processors to perform a method according to any one of Examples 1-7. This feature has the technical effect and/or advantage of improving and/or specially programming a computer program product to perform the method steps described above.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 (i.e., a "storage infrastructure management module 150") for facilitating storage system code level upgrades. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring to FIG. 2, as previously mentioned, the code level (e.g., firmware, etc.) of enterprise storage systems may be periodically updated to fix bugs, provide performance enhancements, implement security improvements, and the like. Staying up to date with the latest code level may be important to ensure the stability and security of the storage system. However, updating the code level of a storage system is a critical operation that requires careful consideration due to potential concerns and risks.

For example, compatibility may be a significant concern. An enterprise storage system is typically an integral part of a larger IT infrastructure, including host servers, storage management software, and network hardware (e.g., switches). For example, FIG. 2 shows a storage infrastructure including multiple host systems 200a-d configured to access common storage 204 (e.g., an enterprise storage system 204), as well as different types of networks 202a, 202b to facilitate communication between the host systems 200a-d and the storage 204. These networks 202a, 202b, which include for example storage area networks (SANs) 202a and other types of networks 202b (LANs, WANs, etc.), may include network hardware such as switches 206 to route data between the host systems 200a-d and storage 204.

Upgrading the code level of the storage system 204 without ensuring compatibility with these other components may lead to unforeseen issues, including data access problems, performance degradation, or even system outages. Any update to the storage system's firmware may introduce changes to the way the storage system operates, potentially affecting the stability of data stored within it. Data loss or corruption, even on a small scale, can have severe consequences for organizations. Thus, its important to thoroughly assess compatibility in order to mitigate risks when performing a code level update of a storage system 204. In certain cases, the amount work required to assess the compatibility of host systems 200 and/or switches 206 with the code level of a particular storage system 204 may discourage upgrading the storage code level. Thus, systems and methods for quickly and reliably assessing this compatibility are needed to facilitate storage code level updates.

Figure 3:
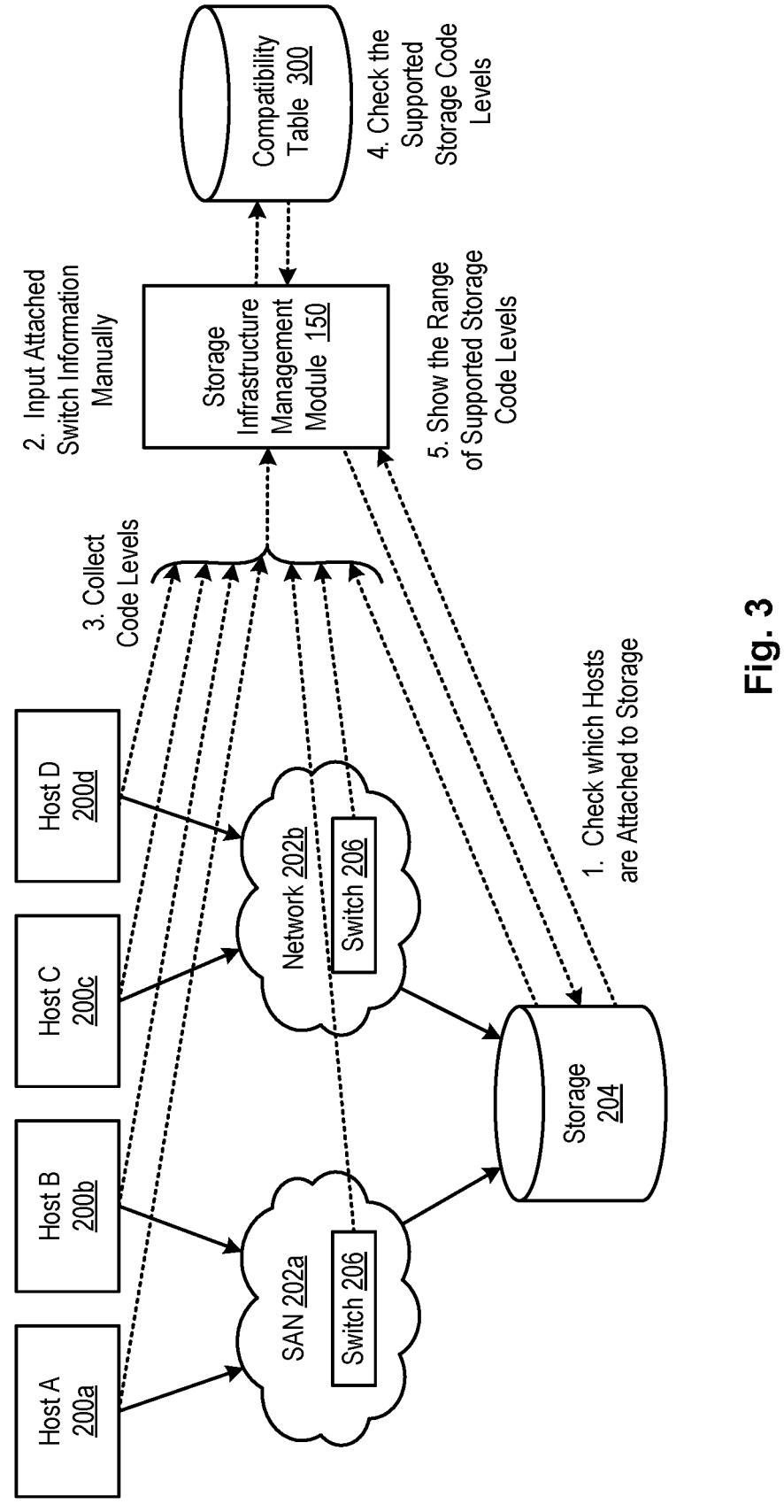
FIG. 3 is a high-level block diagram showing a storage infrastructure management module configured to gather data about the host systems, switches, and storage.

Referring to FIG. 3, in certain embodiments, a storage infrastructure management module 150 may be provided to manage host systems 200, switches 206, and storage systems 204 in a storage infrastructure. For example, host systems 200, switches 206, and storage systems 204 in a storage infrastructure may initially be registered with the storage infrastructure management module 150. The storage infrastructure management module 150 may, in turn, check the code level of the devices. For example, the storage infrastructure management module 150 may determine the version of an operating system, host bus adapter, and/or network interface card associated with a particular host system 200 to determine the code level of a host system 200. Similarly, the storage infrastructure management module 150 may determine the firmware or operating system of any switches communicating with the storage system 204 in determining the code level of a switch 206. In certain embodiments, the storage infrastructure management module 150 maintains a compatibility table 300 that records the compatibility of a host code level or switch code level with a particular storage code level or range of storage code levels. In certain embodiments, the storage infrastructure management module 150 is or is implemented by a product such as IBM's Storage Insights.

FIG. 3 shows a series of steps that may be performed by the storage infrastructure management module 150. First, the storage infrastructure management module 150 may check which host systems 200 are attached to storage 204. Second, the storage infrastructure management module 150 may receive manual input regarding which switches 206 are used between the host systems 200 and the storage 204. The storage infrastructure management module 150 may then collect the current code levels of the host systems 200, switches 206, and storage 204. Using this information, the storage infrastructure management module 150 may check the compatibility table 300 to determine the compatibility of the host systems 200 and/or switches 206 with various storage code levels. The storage infrastructure management module 150 may then show a common range of supported storage code levels, as will be discussed in more detail in association with FIGS. 7 and 8.

Figure 4:
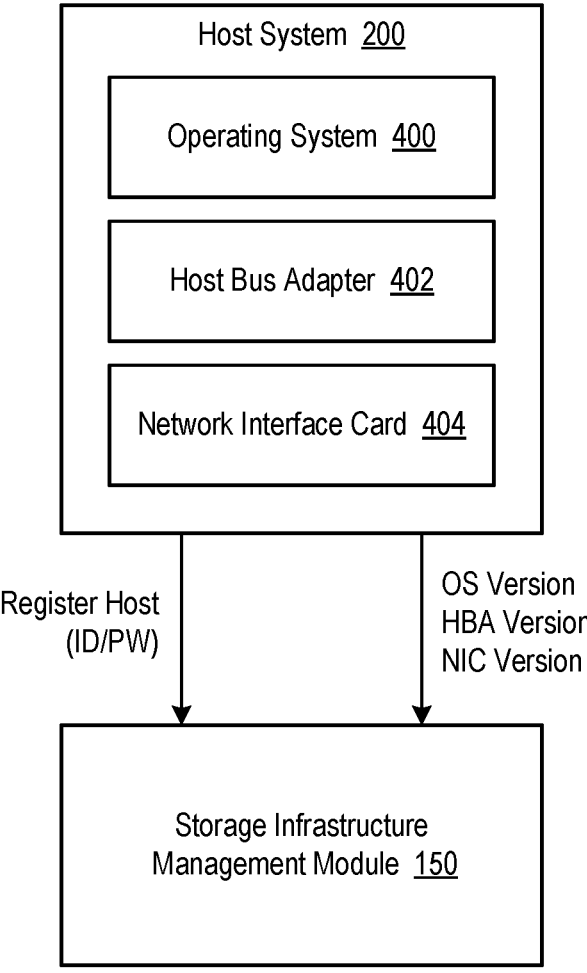
FIG. 4 is a high-level block diagram showing the storage infrastructure management module gathering information with respect to a host system.

Referring to FIG. 4, a high-level block diagram showing a storage infrastructure management module 150 (e.g., IBM's Storage Insights product) gathering information with respect to a host system 200 is illustrated. As shown, a host system 200 may be initially registered with the storage infrastructure management module 150, such as by providing the storage infrastructure management module 150 an identification and password (ID/PW) of the host system 200. This may enable the storage infrastructure management module 150 to collect the version of the operating system 400, host bus adapter 402, and/or network interface card 404 of the host system 200. This information may, in turn, be helpful to determine the compatibility of the host system 200 with different storage code levels.

Figure 5:
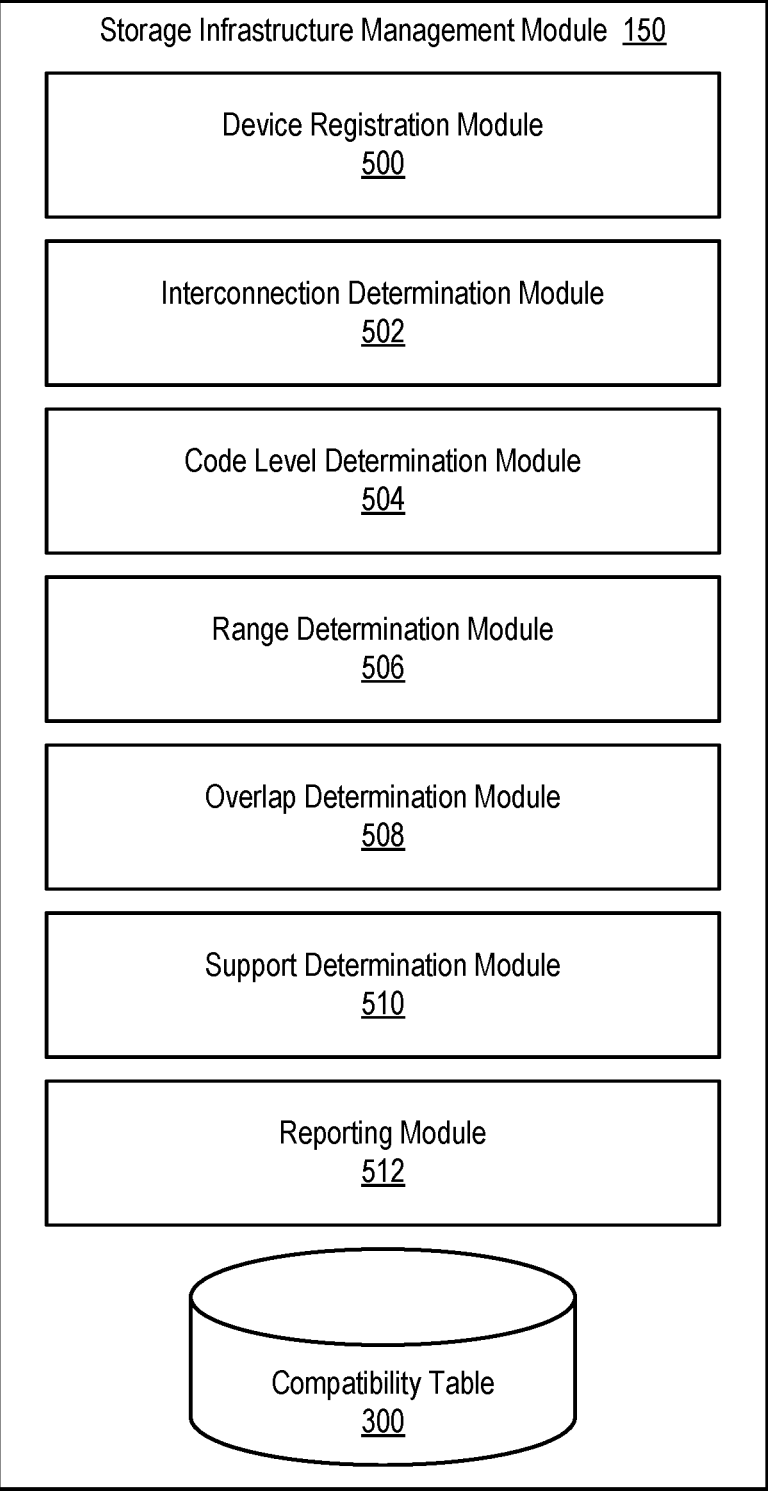
FIG. 5 is a high-level block diagram showing a storage infrastructure management module and various internal sub-modules.

Referring to FIG. 5, a high-level block diagram showing a storage infrastructure management module 150 and various internal sub-modules is illustrated. These modules may be implemented in hardware, software, firmware, or combinations thereof. The modules are presented by way of example and not limitation. More or fewer modules may be provided in different embodiments. For example, the functionality of some modules may be combined into a single or smaller number of modules, or the functionality of a single module may be distributed across several modules. Although the modules and associated functionality are shown in certain locations or within certain components (i.e., within the storage infrastructure management module 150) they are not necessarily located where they are illustrated. Thus, the location of the modules is provided by way of example and not limitation.

As shown, the storage infrastructure management module 150 may include one or more of a device registration module 500, interconnection determination module 502, code level determination module 504, range determination module 506, overlap determination module 508, support determination module 510, and reporting module 512.

The device registration module 500 may be configured to register devices with the storage infrastructure management module 150. These devices may include host systems 200, switches 206, storage systems 204, and the like. Registration may, in certain embodiments, include providing identification and password information for the devices to the storage infrastructure management module 150.

The interconnection determination module 502 may determine the interconnection between the devices, such as which switches 206 are used between the host systems 200 and the storage 204. The code level determination module 504, by contrast, may determine the code levels for the various devices. This may include, for example, determining one or more of a version of an operating system 400, host bus adapter 402, or network interface card 404 for host systems 200, a version of firmware or operating system being used with a switch 206, and/or a storage code level being used by a storage system 204.

Figure 7:
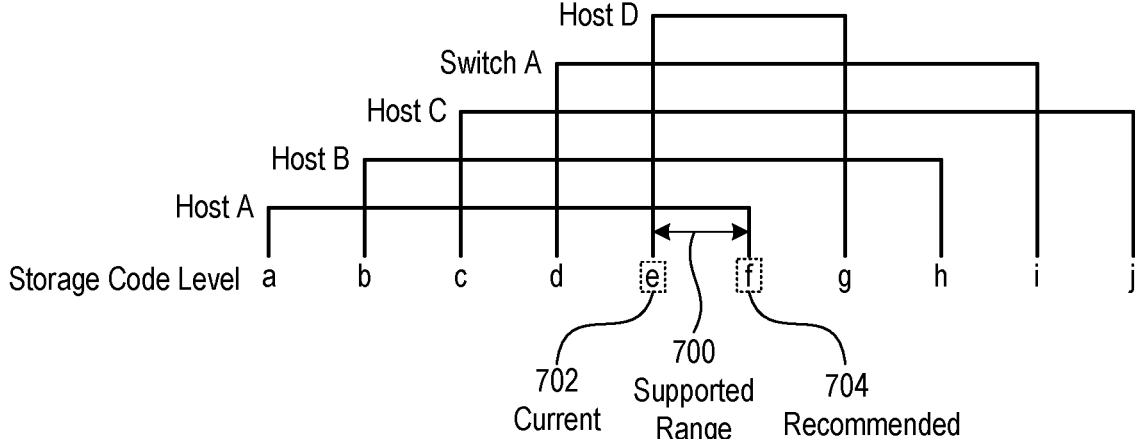
FIG. 7 is a diagram showing a range of storage code levels supported by several host systems and a switch without upgrading the code level of any of the host systems or switch.
Figure 8:
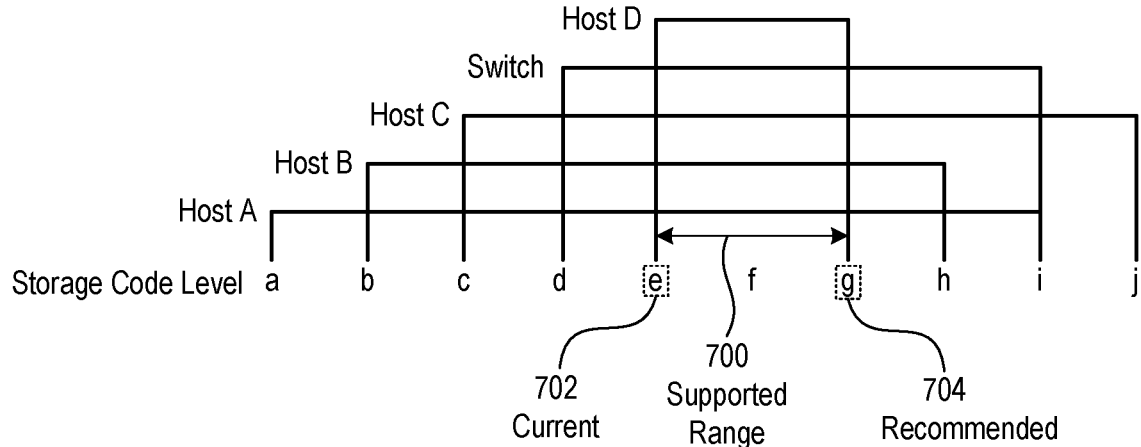
FIG. 8 is a diagram showing a range of storage code levels supported by different host systems and a switch after upgrading the code levels of one or more of the host systems and switch.

The range determination module 506 may determine a range of supported storage code levels that each device (i.e., host systems 200, switches 206, etc.) can support based on the devices' current code level. For example, FIG. 7 is a diagram showing a range of storage code levels supported by different host systems 200 (i.e., Host Systems A through D) and a switch 206 (i.e., Switch A) based on their current code level. The diagram shows storage code levels a-j and assumes that storage code level "a" is the earliest storage code level and storage code level "j" is the latest storage code level associated with a storage system 204. In the illustrated diagram, Host A supports storage code levels a-f, Host B supports storage code levels b-h, Host C supports storage code levels c-j, and so forth.

Referring again to FIG. 5, the overlap determination module 508 may determine an area of overlap for the ranges of each of the host systems 200 and switches 206. For example, referring again to FIG. 7, the overlap determination module 508 may determine the area of overlap 700 for the ranges of each of the devices. From this area of overlap, the support determination module 510 may determine the "supported range" 700. As shown, the supported range 700 includes the storage code levels "e" and "f". Assuming that "e" is the current storage code level 702 of the storage system 204, the storage code level may be upgraded to "f" (i.e., the recommended storage code level 704) without upgrading the code level of any of the host systems 200 (i.e., Hosts A-D) or the switch 206 (i.e., Switch A).

Thus, the support determination module 510 may determine the supported range 700 that represents an area of overlap of the individual ranges of the devices. The latest storage code level within this supported range 700 may be a "recommended" storage code level 704 that may be used to update the storage 204 without upgrading the code level of any of the host systems 200 or switches 206 in the storage infrastructure. The reporting module 512 may report the supported range 700 to a user so that the user may determine the "recommended" storage code level 704. This may, in certain embodiments, encourage an individual or entity to upgrade the storage code level since it may not require upgrading the code level of any host system 200 or switch 206 in the storage infrastructure.

In certain embodiments, the overlap determination module 508 and support determination module 510 may also be configured to provide a supported range 700 and associated "recommended" storage code level 704 (also referred to herein as a "potential" storage code level 704) in the event the code level for one or more host systems 200 and/or switches 206 is upgraded. For example, referring to FIG. 8, assume that the code level for Host A is upgraded such that it can now support a storage system 204 with storage code levels a-i. This may change the area of overlap and thus the supported range 700 from storage code level "e" to storage code level "g". Assuming that "e" is the current storage code level 702 of the storage system 204, the storage code level may now be upgraded to "g" (i.e., the recommended storage code level 704) assuming that the code level of Host A is upgraded in the illustrated manner. The reporting module 512 may report the supported range 700 to a user so that the user may determine the latest storage code level to which a storage system 204 can be upgraded assuming that the code level of one or more host systems 200 or switches 206 is upgraded. In certain embodiments, the reporting module 512 may report the specific host systems 200 and/or switches 206 that need to be upgraded in order to support a certain storage code level or storage code level range.

Figure 6:
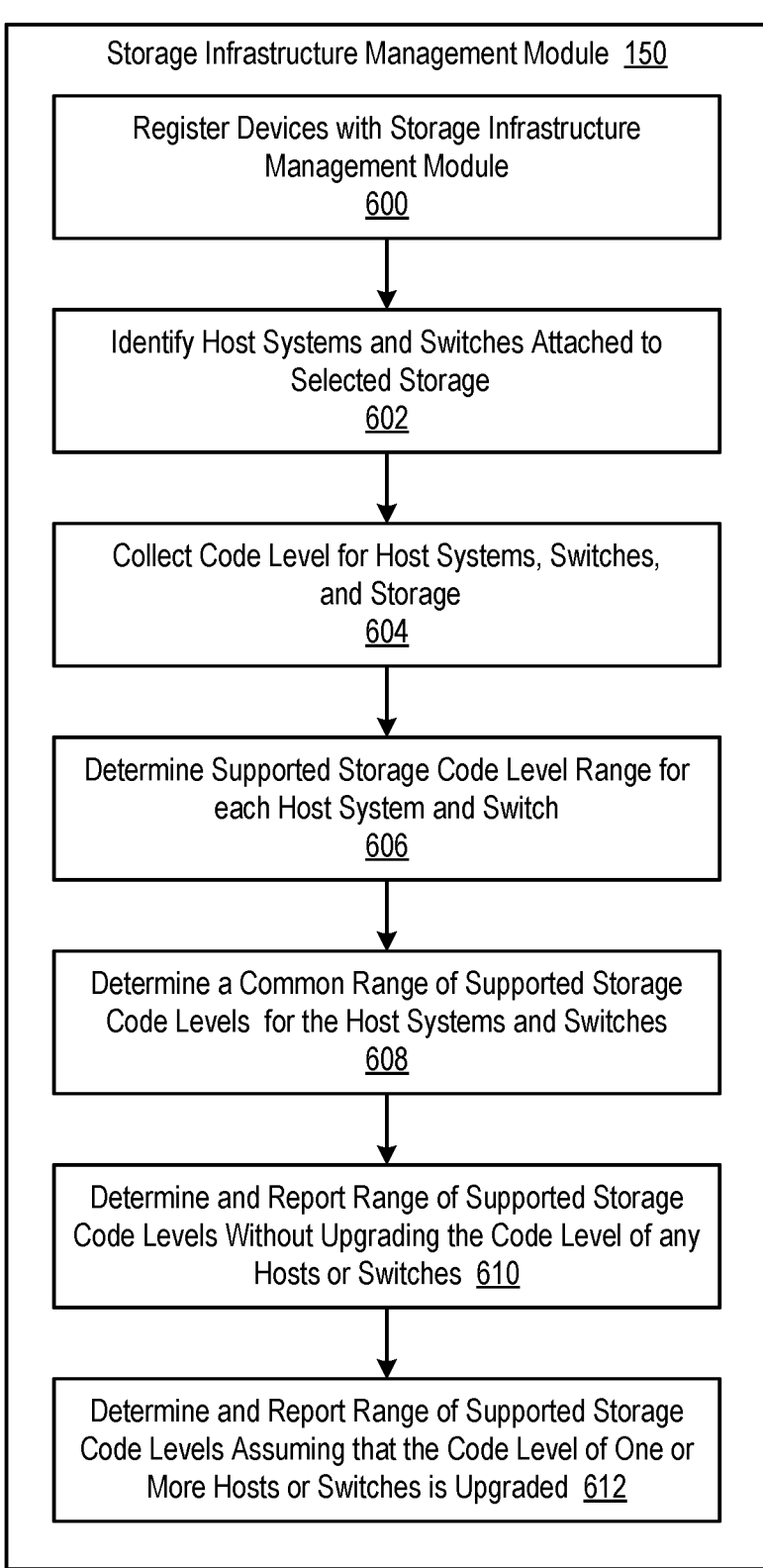
FIG. 6 is a process flow diagram showing various steps that may be performed by a storage infrastructure management module in accordance with the invention.

Referring to FIG. 6, a process flow diagram showing steps 600-612 that may be performed by a storage infrastructure management module 150 is illustrated. These steps 600-612 may roughly correspond to the functionality of the sub-modules discussed in association with FIG. 5.

As shown, the storage infrastructure management module 150 may initially register 600 devices with the storage infrastructure management module 150. These devices may include host systems 200, switches 206, storage systems 204, etc. This step 600 may include providing identification and password information for the devices to the storage infrastructure management module 150.

The storage infrastructure management module 150 may then identify 602 the interconnection between devices, and more specifically which host systems 200 and switches 206 are attached to the storage 204. The storage infrastructure management module 150 may then collect 604 the code levels of the host systems 200, switches 206, and storage 204. This may include determining versions of operating systems 400, host bus adapters 402, and/or network interface cards 404 for host systems 200, versions of firmware or operating systems for switches 206, and/or storage code levels used by storage 204.

The storage infrastructure management module 150 then determines 606 a range of supported storage code levels that each host system 200 and switch 206 in the storage infrastructure can support based on their current code levels. The storage infrastructure management module 150 may then determine 608 a common range (i.e., an area of overlap) for the ranges of each host system 200 and switch 206. From this area of overlap, the storage infrastructure management module 150 may determine 610 and report 610 a range of storage code levels that are supported without upgrading the code level of any host system 200 or switch 206. In certain embodiments, the storage infrastructure management module 150 may also determine 610 and report 610 a range of storage code levels that are supported in the event the code level of one or more host systems 200 and/or switches 206 is upgraded.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer-implemented method for facilitating storage system upgrades, the method comprising:

identifying host systems configured to access a storage system;

identifying a current host code level for each host system;

determining a range of storage code levels that each of the host systems can support, wherein each storage code level is ordered in the range corresponding to a level of data reliability provided by supported versions of firmware that are capable of running on each of the host systems;

determining a latest storage code level for the storage system that is supported by each host system at its current host code level; and upgrading the storage system to the latest storage code level without upgrading the current host code level of each host system.

2. The method of claim 1, wherein the host systems comprise at least one of a selection from the group consisting of: operating systems, host bus adapters, network interface cards, hypervisors, and switches.

3. The method of claim 1, wherein reporting the latest storage code level further comprises reporting an overlapping range of storage code levels that are supported by each host system at its current host code level.

4. The method of claim 1, further comprising responsive to the host code level of at least one host system being upgraded, determining a potential storage code level for the storage system that is supported by each host system.

5. The method of claim 1, wherein identifying a current host code level for each host system comprises checking a compatibility table to identify the current host code level for each host system.

6. The method of claim 1, wherein the storage system is an enterprise storage system.

7. A computer program product for facilitating storage system upgrades, the computer program product comprising a computer-readable storage medium having computer-usable program code embodied therein, the computer-usable program code configured to perform the following when executed by at least one processor:

identify host systems configured to access a storage system;

identify a current host code level for each host system;

determine a range of storage code levels that each of the host systems can support, wherein each storage code level is ordered in the range corresponding to a level of data reliability provided by supported versions of firmware that are capable of running on each of the host systems;

determine a latest storage code level for the storage system that is supported by each host system at its current host code level; and upgrade the storage system to the latest storage code level without upgrading any of the current host code level of each host system.

8. The computer program product of claim 7, wherein the host systems comprise at least one of operating systems, host bus adapters, network interface cards, hypervisors, and switches.

9. The computer program product of claim 7, wherein reporting the latest storage code level further comprises reporting an overlapping range of storage code levels that are supported by each host system at its current host code level.

10. The computer program product of claim 7, wherein the computer-usable program code is further configured to responsive to the host code level of at least one host system being upgraded, determine a potential storage code level for the storage system that is supported by each host system.

11. The computer program product of claim 7, wherein identifying a current host code level for each host system comprises checking a compatibility table to identify the current host code level for each host system.

12. The computer program product of claim 7, wherein the storage system is an enterprise storage system.

13. A system for facilitating storage system upgrades, the system comprising:

at least one processor; and at least one memory device operably coupled to the at least one processor and storing instructions for execution on the at least one processor, the instructions causing the at least one processor to:

identify host systems configured to access a storage system;

identify a current host code level for each host system;

determine a range of storage code levels that each of the host systems can support, wherein each storage code level is ordered in the range corresponding to a level of data reliability provided by supported versions of firmware that are capable of running on each of the host systems;

determine a latest storage code level for the storage system that is supported by each host system at its current host code level; and upgrade the storage system to the latest storage code level without upgrading any of the current host code level of each host system.

14. The system of claim 13, wherein the host systems comprise at least one of operating systems, host bus adapters, network interface cards, hypervisors, and switches.

15. The system of claim 13, wherein reporting the latest storage code level further comprises reporting an overlapping range of storage code levels that are supported by each host system at its current host code level.

16. The system of claim 13, wherein the instructions further cause the at least one processor to responsive to the host code level of at least one host system being upgraded, determine a potential storage code level for the storage system that is supported by each host system.

17. The system of claim 13, wherein identifying a current host code level for each host system comprises checking a compatibility table to identify the current host code level for each host system.

\* \* \* \* \*